United States Patent
Hilti et al.

(10) Patent No.: US 12,030,044 B2
(45) Date of Patent: Jul. 9, 2024

(54) DEVICE AND METHOD FOR EXACT LIQUID-CLASS-INDEPENDENT PIPETTING

(71) Applicant: HAMILTON BONADUZ AG, Bonaduz (CH)

(72) Inventors: Jonas Hilti, Balzers (LI); Jürg Rast, Mollis (CH)

(73) Assignee: HAMILTON BONADUZ AG, Bonaduz (CH)

( * ) Notice: Subject to any disclaimer, the term of this patent is extended or adjusted under 35 U.S.C. 154(b) by 290 days.

(21) Appl. No.: 17/765,663

(22) PCT Filed: Oct. 1, 2020

(86) PCT No.: PCT/EP2020/077517
§ 371 (c)(1),
(2) Date: Mar. 31, 2022

(87) PCT Pub. No.: WO2021/064100
PCT Pub. Date: Apr. 8, 2021

(65) Prior Publication Data
US 2022/0379295 A1    Dec. 1, 2022

(30) Foreign Application Priority Data
Oct. 2, 2019    (DE) .............................. 1019126731.5

(51) Int. Cl.
*B01L 3/02*    (2006.01)

(52) U.S. Cl.
CPC .......... *B01L 3/0237* (2013.01); *B01L 3/0227* (2013.01); *B01L 2300/0663* (2013.01); *B01L 2400/0478* (2013.01)

(58) Field of Classification Search
None
See application file for complete search history.

(56) References Cited

U.S. PATENT DOCUMENTS 5,895,838 A * 4/1999 Harjunmaa ........... G01F 11/027
73/864.13

FOREIGN PATENT DOCUMENTS

DE    102017201114 A1 * 7/2018    ............ B01L 3/0268

OTHER PUBLICATIONS

DE102017201114 (Year: 2018).*

* cited by examiner

*Primary Examiner* — P. Kathryn Wright
(74) *Attorney, Agent, or Firm* — Tollefson IP

(57) ABSTRACT

The present application relates to a pipetting device and a pipetting method for pipetting, therefore for aspirating and/or dispensing, a metered liquid using a working gas, independently of the flow- and/or wetting characteristics of the metered liquid, wherein a pipetting channel comprises a first working region, of which the known base temperature is in a lower base temperature range, and a second working region, of which the known working temperature is in a working temperature range that is increased with respect to the base temperature range.

20 Claims, 4 Drawing Sheets

DEVICE AND METHOD FOR EXACT LIQUID-CLASS-INDEPENDENT PIPETTING

CROSS-REFERENCE TO RELATED APPLICATIONS

Figure 1:
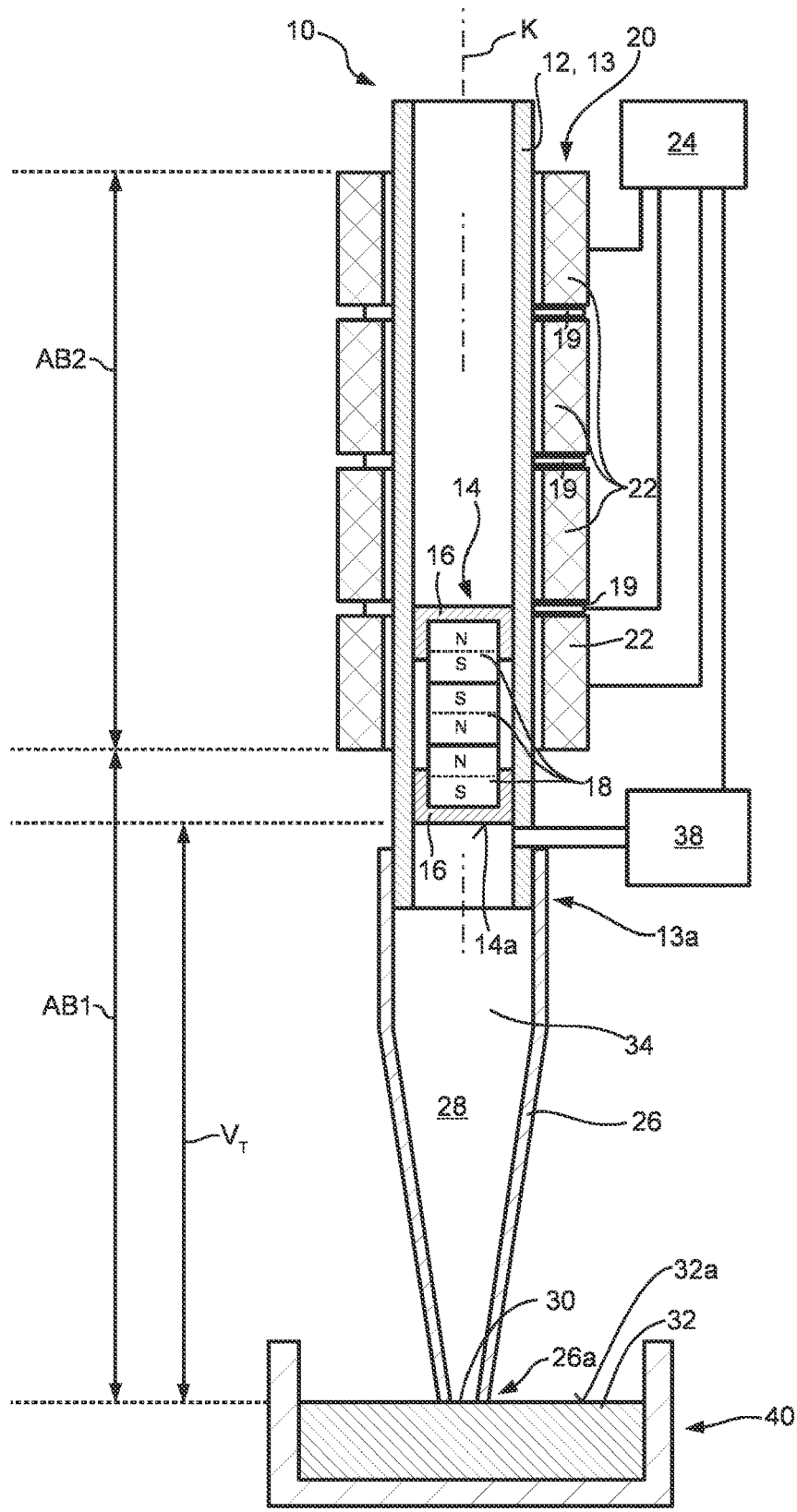

This application is the National Stage of International Application No. PCT/EP2020/077517, filed on Oct. 1, 2020, which claims the benefit of German Application No. 10 2019 126 731.5, filed on Oct. 2, 2019. The entire contents of both applications are hereby incorporated herein by reference.

BACKGROUND OF THE INVENTION

The present invention concerns a pipetting device for pipetting, that is, for aspiration and/or for dispensing, of a dosing liquid under the mediation of a working gas, where the pipetting device comprises:
A pipetting duct extending along a duct axis,
A pipetting piston movable in the pipetting duct along the duct axis,
An accommodating space for accommodating dosing liquid, which extends in the pipetting duct along the duct axis from a pipetting aperture at one end to a dosing-side piston surface of the pipetting piston facing towards the pipetting aperture at the other end, where working gas is accommodated in the pipetting duct immediately adjacent to the dosing-side piston surface, where a working gas reference volume is defined by the volume of working gas which is situated in the accommodating space under a working gas reference pressure,
A driving device coupled with the pipetting piston in a force-transmitting manner, which is configured to displace the pipetting piston along the duct axis,
A position acquisition device which acquires a position of the pipetting piston along the duct axis and outputs a position acquisition signal which represents the acquired position,
A pressure acquisition device which acquires a pressure of the working gas in the pipetting duct and outputs a pressure acquisition signal which represents the acquired pressure, and
A control device,
Where the control device is configured, in accordance with
the pressure acquisition signal,
the working gas reference pressure, and
a defined target dosing liquid volume to be pipetted,
to actuate the driving device, taking into account a pressure-change induced change in the working gas reference volume effected by the piston movement, where the control device is further configured to perform the piston movement required for pipetting the target dosing liquid volume in several consecutive movement steps.

SUMMARY OF THE INVENTION

The present invention further concerns a method for correct pipetting of a dosing liquid with a pipetting device.

The pipetting device and the pipetting method of the present application concern solely pipetting procedures using the air displacement method, in which between the dosing liquid to be pipetted and the piston surface of the pipetting piston facing towards it there is situated an enclosed working gas quantity with a working gas volume, which quantitatively lies at least at the order of magnitude of the volume of the dosing liquid to be accommodated in the pipetting duct. Normally, the volume of working gas enclosed between the dosing-side piston surface and the dosing liquid is greater than the volume of dosing liquid accommodated in the pipetting duct.

In the present application, any pipetting tip that may be coupled to the pipetting device is regarded in this process as part of the pipetting duct. Normally, dosing liquid is aspirated only into such a pipetting tip and dispensed from the pipetting tip, more precisely from the supply aspirated into the pipetting tip. Furthermore, normally in this process the pipetting tip is not filled completely with dosing liquid. The volume of the enclosed working gas quantity is usually between 50 µl and 1000 µl. This applies equally to the state of the art and to the present invention.

The accuracy of a pipetting procedure as regards the accommodated or released quantity of dosing liquid depends in this process on properties of the dosing liquid, such as for instance its viscosity, its density, its wetting behavior in respect of the material of the pipetting duct, and its surface tension. If different liquids with different properties as listed above are pipetted by the same pipetting device with the same pipetting parameters, such as for instance the displacement path and the displacement velocity of the piston, normally the two liquids end up with different quantities of dispensed and/or aspirated dosing liquid respectively, depending on the direction in which the pipetting procedure proceeds.

Thus far, this fact has been taken into account in pipetting technology by dividing dosing liquids into classes of liquids with the same or sufficiently similar pipetting properties. For each liquid class thus formed, correction values can then be stored in a data memory of the pipetting device and applied to pipetting parameters in order to displace the pipetting piston in such a way that the actual pipetted volume of dosing liquid agrees as accurately as possible with the target volume to be pipetted. Thus for example for liquids with especially high viscosity which exhibit high flow resistance, the volume to be covered by the pipetting piston can be greater by a specific factor than the dosing liquid volume to be pipetted by the pipetting piston movement and/or the displacement velocity of the pipetting piston can be decreased during the pipetting starting from a standard value in order to compensate for the high flow resistance and to pipette the desired dosing liquid quantity as accurately as possible.

The drawback is that the liquid class of a liquid to be pipetted has to be known in order to be able to pipette it as precisely as possible using the air-displacement method. In fact, for numerous dosing liquids there exist liquid classes and correction values associated with the classes. Considerable difficulties arise, however, if a dosing liquid of an unknown class is to be pipetted, for instance a dosing liquid produced by mixing different liquids and not assigned to any liquid class. Then, through costly experiments, either the unknown dosing liquid has to be assigned to a liquid class or a new liquid class created and defined, in order to be able to pipette the unknown dosing liquid correctly.

A pipetting device of the type mentioned at the beginning is known from EP 1 250 956 B1. This publication discloses a pipetting device in which a pressure change in the working gas volume enclosed in the pipetting duct, effected by a movement of the pipetting piston, is taken into account in order to be able to determine as accurately as possible the working gas volume enclosed in the pipetting duct after completion of a pipetting piston movement, and from this to be able to infer the most accurate determination possible of the volume of dosing liquid present in the pipetting duct. The publication assumes, according to its own statement, the ideal gas equation. In fact, however, the compensation of the pressure change-induced volume change of the working gas put forward in EP 1 250 956 B1 is based on the special case of the Boyle-Marriotte law, since EP 1 250 956 B1 assumes a purely isothermal change of state of the working gas.

Additionally, the pipetting method known from this publication takes into account a purely empirically-based dosing liquid residual quantity which flows through the pipetting aperture of the pipetting duct after the end of the pipetting piston movement, presumably due to inertia. EP 1 250 956 B1 is silent on the precise reasons for the after-flow of the residual quantity, and merely refers to experience as the way of determining it.

From U.S. Pat. No. 5,895,838 A there is known a pipetting device whose pipetting duct exhibits two zones at different temperatures, namely one zone located nearer to the pipetting piston with a higher working gas temperature and one zone located nearer to the pipetting aperture with a lower working gas temperature. If the pipetting piston is moved, working gas is moved as a result from one zone into the other and consequently warmed up or cooled down, depending on the direction of movement, which in turn results in a volume change of the warmed up or cooled down working gas quantity. The publication proposes to correct the target volume to be pipetted by the temperature-induced volume change of the working gas and to pipette a correspondingly increased or decreased target volume.

The temperature compensation of the target pipetting volume proposed in U.S. Pat. No. 5,895,838 A takes place according to the Gay-Lussac law, which assumes an isobaric change of state i.e. a constant pressure of the warmed up or cooled down working gas respectively.

From DE 196 51252 A1 there are furthermore known a method and a device for contactless determination of a material volume accommodated in a closed container. To this end, accurate quantitative changes are made in a state variable, i.e. pressure, volume, temperature, or quantity of a gas fraction contained in the closed container and inferences are drawn from the changes effected hereby in the rest of the state variables of the gas fraction by applying the ideal gas equation to the gas volume and finally to the material volume.

Starting from the above, it is the task of the present invention to propose a technical approach which makes possible accurate pipetting of dosing liquids without previously determining their liquid class and without previously determining their physical properties which are relevant for pipetting such as viscosity, density, wettability, surface tension, and the like.

According to a first aspect of the present invention, this task is solved by a pipetting device of the type mentioned at the beginning whose pipetting duct exhibits a first working range whose known base temperature lies in a lower base temperature range and a second working range whose known working temperature lies in a working temperature range higher than the base temperature range, where the control device is configured, after a first pipetting piston movement step for a subsequent pipetting piston movement step, To establish a first correction variable which represents a pressure change-induced volume change in a part lying in the first working range of the working gas volume enclosed in the pipetting duct, on the basis of the position acquisition signal, the pressure acquisition signal, and the working gas reference pressure, and To establish a second correction variable which represents a both pressure change-induced and temperature change-induced volume change in a part lying in the second working range of the working gas volume enclosed in the pipetting duct, on the basis of the position acquisition signal, the pressure acquisition signal, the working gas reference pressure, the known working temperature, and the known base temperature, And to establish a target step movement volume of the pipetting piston, taking account of and/or on the basis of respectively A step reference volume assigned to the subsequent pipetting piston movement step, A previous displacement volume of the dosing-side piston surface of the pipetting piston in the current pipetting procedure, The first correction variable, and The second correction variable, and to actuate the driving device in accordance with the established target step movement volume.

The working gas reference pressure is preferably the pressure of the working gas at the start of the pipetting procedure. If before an aspiration procedure the pipetting duct is filled solely with working gas, the working gas reference pressure is preferably the ambient pressure of the pipetting device, since then the working gas in the pipetting duct is in pressure-equalizing communication via the pipetting aperture with the gas of the surrounding atmosphere. If a quantity of dosing liquid is already accommodated in the pipetting duct at the start of an aspiration procedure, once again the working gas reference pressure can be the ambient pressure or the working gas pressure at the start of the aspiration procedure. The same applies to a dispensing procedure. A quantity of dosing liquid is always accommodated in the pipetting duct at the start of a dispensing procedure, starting from which there is dispensing through the pipetting aperture. Here too, the working gas reference pressure can be the working gas pressure at the start of the dispensing procedure or it can be the ambient pressure.

In the present application, the "pipetting procedure" or "current pipetting procedure" denotes the pipetting procedure to which the intake or release of the target dosing liquid quantity is assigned as the pipetting result.

The working gas reference volume can be the dead volume of the pipetting duct, filled solely with working gas and present between the pipetting aperture and the dosing-side piston surface, at a predetermined position of the pipetting piston in the pipetting duct, for instance in a reference state in which the pipetting piston is situated at its lower dead point, the pipetting duct is filled solely with working gas, and the pipetting aperture is clear, such that pressure communication of the working gas with the external environment of the pipetting device is possible. This dead volume can be physically separated from the external environment by submerging the pipetting aperture in a dosing liquid reservoir. When setting the pipetting aperture onto the liquid level of a dosing liquid reservoir, the ambient pressure will obtain in the working gas in the pipetting duct which is then separated from the external environment.

The target dosing liquid volume is usually specified as target value of the pipetting procedure and therefore known.

A step reference volume for a pipetting piston movement step can be specified i.e. predetermined independently of the target dosing liquid volume to be pipetted, for instance by taking into account the construction and kinematics of the pipetting device.

Alternatively, the control device can, starting from the target dosing liquid volume, establish for the subsequent pipetting piston movement step a step reference volume as a base-measure for a movement to be traversed by the dosing-side piston surface. This can take place, for example, by using a computation formula stored in a data memory, which in accordance with a predetermined number of pipetting piston movement steps for performing the pipetting procedure which pipettes the target dosing liquid volume and further in accordance with the target dosing liquid volume to be pipetted during the pipetting procedure, calculates a step reference volume for one or for a plurality of pipetting piston movement steps. Alternatively, this can take place by reading out step reference volumes from a specified data relationship, which on the basis of a number of pipetting piston movement steps and of the target dosing liquid volume as starting data, assigns to the individual pipetting piston movement steps a step reference volume.

The step reference volume can be a sequence of values specified in a fixed manner for a predetermined number of pipetting piston movement steps. Alternatively, the step reference volume can for example be a ratio of the target dosing liquid volume and a predetermined number of pipetting piston movement steps. If the target dosing liquid volume is to be divided uniformly across all the pipetting piston movement steps, the predetermined number of pipetting piston movement steps can be the total number of pipetting piston movement steps of the pipetting procedure.

Preferably the number of pipetting piston movement steps across which the target dosing liquid volume is divided is smaller than the total number of pipetting piston movement steps of the pipetting procedure, such that the pipetting procedure additionally comprises pipetting piston movement steps in which the piston, compared with the pipetting piston movement steps of the target dosing liquid volume, is moved with relatively small movement volumes predominantly or solely for correcting the dosing liquid volume already accommodated in the pipetting duct, but not for the intake of a larger quantity of dosing liquid. The step reference volumes preferably differ quantitatively, however, beyond the individual pipetting piston movement steps of the pipetting procedure in order to be able to take into account knowledge and experience won thus far regarding the pipetting of liquids. Thus for example during pipetting, in particular during aspiration, preferably an incremental step reference volume for pipetting piston movement steps which are nearer to the beginning of the pipetting procedure is quantitatively greater than for pipetting piston movement steps which are nearer to the end of the pipetting procedure. Thus overshooting and/or after-flow behavior of dosing liquid during pipetting, in particular during aspiration, can be taken into account.

The step reference volume, predetermined or determinable as described above, serves as a base-movement step size of the pipetting piston along the duct path for the respective subsequent pipetting piston movement step. A step reference volume aligned with the target dosing liquid quantity and a target step movement volume assigned to the same pipetting piston movement step will differ from one another less strongly than a step reference volume of the same pipetting piston movement step predetermined independently of the target dosing liquid quantity and the associated target step movement volume. This, however, plays no significant role in the pipetting success, since fundamentally it does not matter which fraction of the established target step movement volume of a pipetting piston movement step is based on the step reference volume and which fraction on a step-correction movement volume which completes the step reference volume to a target step movement volume.

Since, because of the working gas in the pipetting duct interacting with the pipetting piston, the liquid class-independent closed- and/or open-loop control respectively of a pipetting procedure discussed here focuses not on the dosing liquid but rather on the working gas and is thus based preferably on the ideal gas equation which predicts the behavior of the working gas very well, movement distances of the pipetting piston are quoted as volumes in the present application. Volumes can be handled directly with the ideal gas equation. Based on the size of the dosing-side piston surface which is known from the respective construction, a step volume can be converted straightforwardly to a pipetting piston step distance along the duct path and the pipetting piston actuated to a corresponding movement.

The control device can be an electronic data-processing device, for instance comprising at least one integrated circuit. Preferably the control device exhibits a data memory in which an operating program and operating data are stored, on the basis of which the electronic data-processing device outputs control commands to the driving device.

The working gas can be an arbitrary working gas. In many applications it will be simply air. It can also, however, for instance if the dosing liquid to be handled so requires, be a noble gas such as for instance helium or argon, or a quasi-inert gas such as for instance nitrogen or carbon dioxide.

The displacement volume thus far of the dosing-side piston surface in the current pipetting procedure up to the subsequent pipetting piston movement step is the volume traversed by the dosing-side piston surface in the course of the current pipetting procedure by displacement along the duct path. This displacement volume takes into account pipetting actions which occurred thus far in the pipetting procedure. Consequently, it is a measure of the pipetting work carried out in the current pipetting procedure up to the subsequent pipetting piston movement step.

The quantity of working gas present in the pipetting duct was manipulated with the movements of the pipetting piston thus far. The working gas quantity was displaced and/or its volume changed, i.e. for instance expanded during aspiration and compressed during dispensing. The aforementioned correction variables: first correction variable and second correction variable, can be utilized in order to determine as accurately as possible the effects of the pipetting piston movement on the working gas thus far in the pipetting procedure. Consequently it is then possible to determine the dosing liquid quantity present in the pipetting duct through the manipulated working gas as accurately as possible.

By performing the pipetting piston movement stepwise and establishing a target step movement volume for each subsequent pipetting piston movement step while factoring in the aforementioned parameters, it is thus possible to pipette with high accuracy the target dosing liquid volume that is to be pipetted with the pipetting procedure.

For the sake of simplicity, the pipetting duct is regarded as divided into two working ranges. In principle, defining further working ranges should not be precluded, but two working ranges already suffice for a highly accurate pipetting result. The working ranges differ by the temperatures prevailing in them, where the temperatures of the working gas are the ones applicable here. For the first working range, whose working gas fraction lies in the lower base temperature range, the first correction variable considers only a pressure change-induced volume change. For the second working range, whose working gas fraction lies in the higher working temperature range, the second correction variable considers a volume change due both to a pressure change and due to a temperature change of a working gas fraction.

The pressure change as the cause of the volume change is effected by the movement of the pipetting piston thus far. Through this movement of the pipetting piston since the beginning of the pipetting procedure, the pressure of the working gas was changed from the original working gas pressure, in particular working gas reference pressure, to the currently prevailing working gas pressure. This pressure change in turn is the cause of a change in the quantity of dosing liquid in the pipetting duct, since besides other physical effects such as for instance friction, the pressure of the working gas prevailing in the pipetting duct is a decisive factor in a certain dosing liquid quantity being held in the pipetting duct. The difference between the current working gas pressure and the working gas pressure, in particular working gas reference pressure, at the start of the pipetting procedure is, therefore, a measure of the change in the dosing liquid quantity accommodated in the pipetting duct. With the change in the working gas pressure during the pipetting procedure, however, the volume of the working gas quantity enclosed in the pipetting duct has also changed from the initial working gas volume to a changed working gas volume. If the dosing liquid quantity present in the pipetting piston after a preceding pipetting piston movement step has to be established, this volume change should be taken into account for each subsequent pipetting piston movement step.

The first working range is preferably a range which is under relatively uniform external conditions. The first working range is preferably arranged, for example, in an ambient atmosphere with a constant or essentially constant ambient temperature. Thus the first working range preferably comprises a pipetting tip which can be detachably coupled with the rest of the pipetting device, and as applicable a device-fixed section of the pipetting duct which is exposed to the ambient atmosphere. Of these sections it can be assumed without great errors that they are permanently at the constant temperature level of the ambient atmosphere.

The second working range of the pipetting duct can be a section of the pipetting duct which in contrast to the first working range is not exposed directly to the ambient atmosphere and/or whose temperature is not influenced decisively by the ambient atmosphere. For this second working range, not only the volume change of the working gas is corrected which is effected by a pressure change caused by the piston movement, but also a volume change of the working gas which is effected by a temperature change between the base temperature and the working temperature.

By establishing the correction values and by using them before every pipetting piston movement step, on the one hand the correction arising at each movement step turns out quantitatively smaller than if a correction were to be established once for the entire pipetting procedure. On the other, highly accurate pipetting in terms of the pipetting quantity is obtained through the correction of the step reference volume to the target step movement volume before each pipetting piston movement step.

Where it is stated in the present case that the position acquisition device acquires a position of the pipetting piston along the duct axis, this comprises direct acquisition of the pipetting piston position just as it does indirect acquisition of same, as long as the acquisition result represents the pipetting piston position, since then the objective is achieved that the position acquisition device can output a position acquisition signal representing the position of the pipetting piston. The same applies mutandis to acquiring the pressure of the working gas in the pipetting duct through the pressure acquisition device. The working gas pressure too can be acquired directly or indirectly, as long as the acquisition result represents the working gas pressure in the pipetting duct.

The present invention starts out by considering the pipetting duct volume between the pipetting aperture and the dosing-side piston surface. The entire volume present between the pipetting aperture and the dosing-side piston surface is filled either with working gas or with working gas and dosing liquid. The present invention is elucidated below using the example of the aspiration procedure, which compared with a dispensing procedure is more difficult to regulate with high accuracy. Furthermore, normally the initial state of a dispensing procedure is produced through aspiration, such that an aspiration procedure can be considered the start of every pipetting procedure.

At the start of the aspiration procedure, with a known position of the dosing-side piston surface—which is equivalent to a known position of the pipetting piston—there is present in the pipetting duct between the pipetting aperture and the dosing-side piston surface solely working gas, whose volume is referred to as working gas dead volume $V_T$. If one now immerses the pipetting aperture slightly in an external dosing liquid reservoir such that the dead volume $V_T$ is separated from the external environment but no dosing liquid penetrates by capillary effects through the pipetting aperture into the pipetting duct, it makes sense to use the working gas dead volume $V_T$, now separated from the environment, as a working gas reference volume. Let the pressure of the working gas at this point in time be the working gas reference pressure, which consequently is the ambient pressure $p_\infty$. The temperature of the working gas is the ambient temperature $T_\infty$.

To begin with, the separation of the pipetting duct into two working ranges at different temperatures shall be ignored in order to elucidate the fundamental principle behind the present invention. The quantity of working gas enclosed between the dosing liquid and the dosing-side piston surface stays constant for the rest of the pipetting procedure, ignoring evaporation processes in the pipetting duct and leakage processes at it. The volume of the enclosed working gas quantity, in contrast, does not stay constant.

If the dosing-side piston surface in its immersed state is moved away from the pipetting aperture by a displacement volume $V_{piston}$, then due to the low pressure thus created relative to the originally prevailing ambient pressure, a volume $V_{liquid}$ of dosing liquid flows from the reservoir through the pipetting aperture into the pipetting duct. Knowing the accommodated volume $V_{liquid}$ of dosing liquid is of great importance for a highly accurate aspiration procedure. In the pipetting duct then prevails a working gas pressure $p_1$ which differs from the working gas reference pressure, at a working gas temperature of $T_1$ which differs from the initial temperature. The original working gas dead volume $V_T$ was thus first increased by $V_{piston}$ and then decreased by the inflowing dosing liquid volume $V_{liquid}$. The working gas volume $V_1$ present in the pipetting duct after the pipetting piston's movement is then obtained as follows:

$$V_1 = V_T V_{piston} - V_{liquid} \qquad \text{Eq. 1}$$

From the ideal gas equation $$p \cdot V = m \cdot R \cdot T \text{ or } \frac{p \cdot V}{T} = const.$$

and the initial conditions described above we obtain:

$$\frac{p_\infty \cdot V_T}{T_\infty} = \frac{p_1 \cdot V_1}{T_1} \qquad \text{Eq. 2}$$

Using Equations 1 and 2, we obtain for the unknown variable volume $V_{liquid}$:

$$V_{liquid} = V_{piston} + V_T \cdot \left(1 - \frac{T_1}{T_\infty} \cdot \frac{p_\infty}{p_1}\right) \qquad \text{Eq. 3}$$

The quantity of dosing liquid $V_{liquid}$ taken up through a movement of the pipetting piston by the volume $V_{piston}$ can thus be established, given a known $V_T$, if $p_\infty$ and $p_1$ are acquirable by the pressure acquisition device, if $T_\infty$ and $T_1$ are acquirable by a temperature acquisition device, or if $T_\infty$ and $T_1$ are known and if $V_{piston}$ is acquirable by the position acquisition device.

However, in the present case a complication arises due to the different temperatures in the working ranges of the pipetting duct. Usually the first working range lies nearer to the pipetting aperture whereas the second working range lies nearer to the dosing-side piston surface. According to a preferred development of the present invention, the first working range begins at the pipetting aperture and reaches from it into the pipetting duct, whereas the second working range exists along a heat source of the pipetting device. If the dosing-side piston surface is situated in the second working range, then depending on the constructional layout of the pipetting device, the first and the second working range are preferably adjacent to one another between the pipetting aperture and the dosing-side piston surface and border on each other. The aforementioned working gas volume $V_1$ enclosed in the pipetting duct then consists of a volume fraction $_{AB1}V_1$ of the first working range and a volume fraction $_{AB2}V_1$ of the second working range.

$$V_1 = {}_{AB1}V_1 + {}_{AB2}V_1 \qquad \text{Eq. 4}$$

In principle, in the present application values associated with the first working range are indicated by "AB1" and values associated with the second working range are indicated by "AB2".

Equation 4 can already apply to the original working gas dead volume $V_T$ (s. subsequent Equation 4') if the original working gas dead volume $V_T$ already extends into both working ranges:

$$V_T = {}_{AB1}V_T + {}_{AB2}V_T \qquad \text{Eq. 4'}$$

Alternatively, the working gas volume enclosed between the dosing liquid and the dosing-side piston surface can be displaced only with the pipetting piston movement during the pipetting procedure in such a way that after a displacement procedure it extends into both working ranges. If the original working gas dead volume $V_T$ extends to begin with into only one working range, normally this is the first working range.

Preferably one starts from the simplifying assumption that the first working range is constantly at a first temperature level, for example given by the ambient temperature $T_\infty$. However, it can also be any other temperature $T_{AB1}$. For the reasons quoted above, however, the assumption of the ambient temperature as the constant temperature of the first working range makes sense. Dosing liquid is, therefore, normally aspirated only into the first working range, such that the aspirated dosing liquid as far as possible is not warmed up or, especially preferably, does not experience a temperature change in the pipetting duct.

If one assumes the preferred case where the dosing-side piston surface is situated, at the start of the aspiration procedure described above by way of an example, at its lower dead point or near it such that the largest possible piston stroke is available for taking in dosing liquid, then the volume $V_{piston}$ traversed by the pipetting piston during the aspiration procedure or during a part-step of it can be situated in the first and/or in the second working range. Therefore we have quite generally:

$$V_{piston} = {}_{AB1}V_{piston} + {}_{AB2}V_{piston} \qquad \text{Eq. 5}$$

$_{AB1}V_{piston}$ can equal 0, and then the entire piston movement lies in the second working range. If $_{AB1}V_{piston}$ is not 0, then initially $_{AB2}V_T = 0$ has to apply since then the initial working gas dead volume $V_T$ is at first displaced by the piston movement only inside the first working range along the duct path, but no working gas fractions are displaced between the first and the second working range.

As an approximation, it can thus be assumed that during a piston movement, working gas is expanded or compressed isothermally in the first working range. This also applies to the fraction $_{AB1}V_{piston}$ of the volume traversed by the dosing-side piston surface lying in the first working range.

As long as during a pipetting procedure the entire working gas volume enclosed between the dosing liquid and the dosing-side piston surface is situated only in the first working range, the pipetting procedure's closed- or open-loop control is non-problematic since the changes to the working gas are then regarded and treated as an isothermal change of states. The present invention becomes useful when the dosing-side piston surface moves in the second working range or begins to move into it.

A volume $_{AB2}V_{piston}$ of working gas which corresponds to the volume fraction of the piston movement lying in the second working range is however displaced between the first and the second working range. During aspiration the displacement takes place from the first into the second working range, and during dispensing in the opposite direction. In the second working range the temperature of the working gas is $T_{AB2}$, with $T_{AB2} > T_\infty$. The temperature of the working gas changes on being displaced between the first and the second working range.

In the case of an isothermal and isobaric piston movement, the volume traversed by the dosing-side piston surface in the pipetting duct would correspond to the change in the quantity of dosing liquid in the pipetting duct since where there is no working gas in the pipetting duct, there has to be dosing liquid.

The piston movement cannot, however, effect an isobaric change of state of the working gas, since only a pressure change in the working gas can perform work on the dosing liquid and displace it through the pipetting aperture.

Because of the displacement of working gas between the first and the warmer second working range, the change of state of the working gas effected by the piston movement cannot be isothermal.

Based on the above assumptions, the fraction of the piston movement lying in the second working range displaces the working gas volume $_{AB2}V_{piston}$ between the first and the second working range. Thereby the temperature of the working gas volume $_{AB2}V_{piston}$ changes during aspiration from $T_\infty$ to $T_{AB2}$ and during dispensing from $T_{AB2}$ to $T_\infty$. In addition, this working gas volume undergoes a pressure change effected by the piston movement.

The fraction of the piston movement lying in the first working range effects only a change in the pressure of the working gas volume $_{AB1}V_{piston}$. The working gas volume $V_{piston}$, which corresponds to the total volume traversed by the dosing-side piston surface, changes thereby due to a pressure change and a temperature change by the following amount:

$$\Delta V_{piston} = {}_{AB2}V_{piston} \cdot \left(\frac{T_{AB2}}{T_\infty} \cdot \frac{p_\infty}{p_{AB2}} - 1\right) + {}_{AB1}V_{piston} \cdot \left(\frac{p_\infty}{p_{AB1}} - 1\right) \quad \text{Eq. 6}$$

Let the first working range extending from the pipetting aperture of the pipetting duct up to a through constructional layout of the pipetting aperture have the volume $V_{AB1}$ in the pipetting duct. Under the simplifying assumption that at first, the volume $V_{liquid}$ of dosing liquid accommodated in the pipetting duct, effected by the piston movement, corresponds to the volume $V_{piston}$ traversed by the dosing-side piston surface, there remains in the first working range, when the dosing-side piston surface is situated in the second working range, a systematic residual volume of working gas $_{AB1}V_{sys,rest}$, for which we have:

$$_{AB1}V_{sys,res} \equiv V_{AB1} - V_{liquid} \approx V_{AB1} - V_{piston} \quad \text{Eq. 7}$$

When initially, i.e. at the start of the pipetting procedure, the dosing-side piston surface is located in the second working range, $V_T$ can be greater than $V_{AB1}$ by an initial volume $_{AB2}V_{init}$ located in the second working range. When $V_T$ is smaller than $V_{AB1}$, the dosing-side piston surface has first to be displaced by $_{AB1}V_{piston}$ up to the boundary between the first and the second working range. The most general version of Equation 7, therefore, bearing in mind Equation 5, is:

$$_{AB1}V_{sys,rest} \approx V_T - {}_{AB2}V_{init} + {}_{AB1}V_{piston} - ({}_{AB1}V_{piston} + {}_{AB2}V_{piston}) = \quad \text{Eq. 7*}$$
$$V_T - {}_{AB2}V_{init} - {}_{AB2}V_{piston}$$

Of course, only either $_{AB2}V_{init}$ or $_{AB1}V_{piston}$ can differ from 0. Since $_{AB1}V_{piston}$ always cancels out of the equation, $_{AB1}V_{piston}$ does not affect the result.

When, as is preferable, $V_{AB1} \geq V_T$ and consequently $_{AB2}V_{init} = 0$, for instance because the first working range, starting from the pipetting aperture, extends beyond a lower dead point or some other starting position of the dosing-side piston surface, Equation 7* can be simplified into:

$$_{AB1}V_{sys,res} \approx V_T + {}_{AB1}V_{piston} - ({}_{AB1}V_{piston} + {}_{AB2}V_{piston}) = V_T - {}_{AB2}V_{piston} \quad \text{Eq. 7'}$$

Since by definition the systematic residual volume exists only in the first working range, the index "AB1" will be omitted from now on when referring to the systematic residual volume. Since consequently the systematic residual volume $V_{sys,rest}$, in the specified operating state of the pipetting device, extends from the meniscus of the dosing liquid facing towards the working gas at or in the pipetting duct up to the boundary of the first working range furthest from the pipetting aperture, the systematic residual volume also includes any fraction of the volume $_{AB1}V_{piston}$ traversed by the dosing-side piston surface during the piston movement which may lie in the first working range. Under the above assumptions, the systematic residual volume $V_{sys,rest}$ undergoes through the piston movement an isothermal change of state, whereby the systematic residual volume $V_{sys,rest}$ changes by the following amount $\Delta V_{sys,rest}$:

$$\Delta V_{sys,res} = V_{sys,res} \cdot \left(\frac{p_\infty}{p_{AB1}} - 1\right) \quad \text{Eq. 8}$$

Equations 7* and 7' show directly that the volume traversed by the dosing-side piston surface in the first working range is already accounted for in the systematic residual volume. Taking into account, in the systematic residual volume, the fraction of the piston movement lying in the first working range and its solely pressure change-induced change, and furthermore under the reasonable assumption that the same working gas pressure $p_{AB2}=p_{AB1}$ obtains in both working ranges since the two working ranges can communicate with one another in a pressure-equalizing manner, there remains from Equation 6 only the fraction of the piston movement lying in the second working range. Equation 6 and Equation 8 thus result in the following Equation 9:

$$_{AB2}\Delta V_{piston} = {}_{AB2}V_{piston} \cdot \left(\frac{T_{AB2}}{T_\infty} \cdot \frac{p_\infty}{p_{AB1}} - 1\right) \quad \text{Eq. 9}$$

The volume of dosing liquid accommodated in the pipetting duct differs from the volume of the piston movement which effects the uptake of the dosing liquid into the pipetting duct by the volume changes of Equations 8 and 9. Expressed as a formula, this means that $$V_{liquid} = V_{piston} - {}_{AB2}\Delta V_{piston} - \Delta V_{sys,rest} \quad \text{Eq. 10}$$

Using Equations 6, 7, and 8, Equation 9 can also be written as:

$$V_{liquid} = V_{piston} - \quad \text{Eq. 10'}$$
$$_{AB2}V_{piston} \cdot \left(\frac{T_{AB2}}{T_\infty} \cdot \frac{p_\infty}{p_{AB1}} - 1\right) - (V_T - {}_{AB2}V_{piston}) \cdot \left(\frac{p_\infty}{p_{AB1}} - 1\right)$$

Equation 10' can be rearranged to yield the following Equation 10":

$$V_{liquid} = V_{piston} - {}_{AB2}V_{piston} \cdot \frac{p_\infty}{p_{AB1}} \cdot \left(\frac{T_{AB2}}{T_\infty} - 1\right) - V_T \cdot \left(\frac{p_\infty}{p_{AB1}} - 1\right) \quad \text{Eq. 10''}$$

The volume $V_T$ is a purely constructional variable of the pipetting device and consequently known. Knowing the temperature $T_{AB2}$ in the second working range, knowing the volume $V_{piston}$ traversed by the dosing-side piston surface and also its fraction $_{AB2}V_{piston}$ in the second working range, which can be established by means of the position acquisition device, knowing the pressure $p_{AB1}$ of the working gas in the pipetting duct, which can be established by means of the pressure acquisition device, and knowing the initial parameters $p_\infty$, $T_\infty$, the volume of dosing liquid accommodated in the pipetting duct can be established by way of approximation for every pipetting piston movement step through one of the equations 10", 10', or 10 independently of the pipetting properties of the dosing liquid.

The temperature ratio $$\frac{T_{AB2}}{T_\infty}$$

is by definition always positive and greater than 1. The pressure ratio $$\frac{p_\infty}{p_{AB1}}$$

likewise is always positive and regularly greater than 1, since the working gas pressure inside the pipetting duct cannot become negative and in the great majority of cases has to be less than the ambient pressure in order to be able to hold the dosing liquid accommodated in the pipetting duct. One exception can occur with small volumes of certain dosing liquids accommodated in the pipetting duct if they can be held in the pipetting duct solely by capillary forces. Then $p_{AB1}$ can be greater than the ambient pressure $p_\infty$.

In Equation 10, the term $\Delta V_{sys,rest}$ is an example of a first correction variable within the meaning of the present application and the term $_{AB2}\Delta V_{piston}$ is a second correction variable within the meaning of the present application.

In Eq. 10', the term $$(V_T - {}_{AB2}V_{piston}) \cdot \left(\frac{p_\infty}{p_{AB1}} - 1\right)$$

is an example of a first correction variable within the meaning of the present application and the term $$_{AB2}V_{piston} \cdot \left(\frac{T_{AB2}}{T_\infty} \cdot \frac{p_\infty}{p_{AB1}} - 1\right)$$

is an example of a second correction variable within the meaning of the present application.

In Eq. 10", the term $$V_T \cdot \left(\frac{p_\infty}{p_{AB1}} - 1\right)$$

is an example of a first correction variable within the meaning of the present application and the term $$_{AB2}V_{piston} \cdot \frac{p_\infty}{p_{AB1}} \cdot \left(\frac{T_{AB2}}{T_\infty} - 1\right)$$

is an example of a second correction variable within the meaning of the present application.

In Equations 10, 10', and 10", $V_{piston}$ is a measure of the displacement volume of the dosing-side piston surface thus far in the current pipetting procedure. For the same state of the pipetting device, all the equations 10, 10', and 10" contain the same value for $V_{liquid}$.

At the end of the pipetting procedure, $V_{liquid}$ describes the target dosing liquid quantity highly accurately. In aspiration procedures starting from the reference state of the pipetting device defined above, $V_{liquid}$ at the end of the pipetting procedure is the pipetted dosing liquid quantity corresponding highly accurately to the target dosing liquid quantity. In pipetting procedures starting from an initial quantity $_{Start}V_{liquid}$ of dosing liquid in the pipetting duct, the pipetted dosing liquid quantity at the end of the pipetting procedure, which corresponds highly accurately to the target dosing liquid quantity, is the difference between the initial and final amount of dosing liquid in the pipetting duct, i.e. $V_{liquid} - {}_{Start}V_{liquid}$. Since, however, such a "prefilled" initial state of the pipetting duct must itself go back again to an aspiration procedure with a pipetting duct filled originally only with working gas, the "prefilled" operating state can likewise be derived through the above depiction of an aspiration procedure. The same applies mutatis mutandis to a dispensing procedure whose initial state likewise must have been aspirated beforehand.

As already shown above, in order to achieve an especially accurate pipetting result the control device can be configured to determine for the subsequent pipetting piston movement step an estimated value for a dosing liquid quantity present in the accommodating space, on the basis of the displacement volume of the dosing-side piston surface of the pipetting piston thus far in the current pipetting procedure, of the first correction variable, and of the second correction variable. Such an estimated value can, for example, be determined using at least one of the Equations 10, 10', and 10" derived above. $V_{liquid} - {}_{Start}V_{liquid}$ is then such an estimated value which makes it possible to determine the pipetted volume of dosing liquid in the pipetting duct as a volume after each pipetting piston movement step. For $_{Start}V_{liquid}=0$, i.e. in the aspiration of dosing liquid starting from the above reference state, $V_{liquid}$ itself is the estimated value.

The control device can be further configured, for the following pipetting piston movement step, to compare the estimated value thus determined with the step reference volume and to establish the target step movement volume on the basis of the comparison result. For example, the target step movement volume can be established from the difference between the estimated value and the step reference volume. Preferably, greater differences result in greater target step-movement volumes than smaller differences.

The step-movement volume is preferably used in this process as a cumulative step-movement volume which represents the sum of all individual step-movement volumes which the pipetting piston has traversed during the preceding movement steps. Preferably, in line with the aforementioned elucidations, the cumulative step-movement volume after the end of the last movement step of the pipetting procedure corresponds here to the target dosing liquid quantity, quoted as a volume. The comparison of the estimated value with the cumulative step-movement volume therefore corresponds to a comparison between a target dosing liquid volume assigned to the movement steps performed thus far, represented by the cumulative step-movement volume, and the in fact pipetted actual dosing liquid volume, represented by the estimated value.

The difference quantity can be converted by the control device into a step-correction movement volume, by means of a proportional and/or differential and/or integral conversion element. The proportional conversion element establishes a proportional step-correction movement volume quantity based on the difference quantity, using a proportionality factor to be determined experimentally or empirically. The differential conversion element establishes a differential step-correction movement volume quantity based on a difference between the current difference quantity and an earlier difference quantity, i.e. based on a change in the difference quantity, using a differential weighting factor to be determined experimentally or empirically. The integral conversion element establishes an integral step-correction movement volume quantity based on a sum of difference quantities, using the current difference quantity and an integral weighting factor to be determined experimentally or empirically.

The target step movement volume of the subsequent pipetting piston movement step can then be the step reference volume assigned to the subsequent pipetting piston movement step. corrected by the step-correction movement volume.

The control device is preferably configured to perform consecutive pipetting piston movement steps until a difference quantity between the determined estimated value and the step reference volume falls below a predetermined difference threshold value, in particular falls below it for a predetermined number of immediately consecutive pipetting piston movement steps. Then the target dosing liquid quantity is normally pipetted with the pipetting accuracy determined by the difference threshold value. This termination criterion leads to highly accurate pipetting results, especially under the additional condition that the step reference volume is a cumulative step reference volume and the pipetting procedure is so far advanced that the cumulative step reference volume corresponds to the target dosing liquid quantity.

Alternatively, the control device can be configured to perform a predetermined number of consecutive pipetting piston movement steps which reliably suffices for pipetting correctly even viscous dosing liquids with high surface tension. In the case of low-viscosity dosing liquids, the result of this can be that substantially before reaching the predetermined number of pipetting piston movement steps, no further appreciable pipetting piston movement takes place since already very early on the estimated value essentially corresponds to the target dosing liquid quantity.

In order to achieve a highly accurate pipetting result, the control device can be configured to perform more than 100, preferably more than 1000, especially preferably more than 10000 pipetting piston movement steps per second. Due to the limits of the dynamics attainable with pipetting pistons, the control device is configured to perform fewer than 100000 pipetting piston movement steps per second.

The control device can, as already described above in more detail, read out the step reference volume assigned to the subsequent pipetting piston movement step in accordance with the target dosing liquid volume from a data memory and/or calculate it based on the target dosing liquid volume.

The step reference volume can be an incremental step reference volume, which starting from the current location of the dosing-side piston surface indicates a step reference volume for a single subsequent pipetting piston movement which the dosing-side piston surface should traverse during this next movement step. Then a cumulative value of the step reference volumes obtained by summing up over the increasing number of steps from the incremental step reference volumes, advantageously exhibits a first step range in which the cumulative value increases from an initial value to a value of at least 95%, preferably to a value of exactly 100%, of the target dosing liquid volume, and exhibits a second step range which follows the first step range, in which the cumulative value does not depart from a range of 95% to 105%, preferably from a value of exactly 100%, of the target dosing liquid volume.

Alternatively, the step reference volume can be an absolute step reference volume—also referred to above as a cumulative step reference volume—which indicates the end-position of the dosing-side piston surface based on its starting position at the start of the pipetting procedure. Once again the value of the absolute and/or cumulative step reference volume respectively over the increasing number of steps exhibits a first step range in which the value of the absolute step reference volume increases from an initial value to a value of at least 95%, preferably to exactly 100% of the target dosing liquid volume, and exhibits a second step range which follows the first step range, in which the value of the absolute step reference volume does not depart from a range of 95% to 105%, preferably of exactly 100%, of the target dosing liquid volume.

Advantageously, the fraction of the second step range out of the entire pipetting procedure in terms of the number of pipetting piston movement steps is greater than 20%, preferably greater than 30%, such that towards the end of the pipetting procedure a settling phase takes place in which the pipetting piston mainly performs correction movements in order to increase the accuracy of the agreement between the target dosing liquid quantity and the actually pipetted dosing liquid quantity. The pipetting piston movement steps performed in this phase usually exhibit a smaller target step movement volume than in the first step range, which makes possible largely unimpaired stable regulation of the pipetting procedure. Thus in the second step range, reciprocal buildup of disturbances in the course of pipetting and corrections of same are nearly precluded because of the small target step-movement volumes here. For the same reason, preferably the second step range exhibits at least the same number or even a larger number of steps and/or preferably lasts for at least the same time duration as or even a longer time duration than the first step range.

In the event of doubt, the start of a pipetting procedure should coincide with the start of the first step range, i.e. start at the point in time from which an incremental step reference volume deviates quantitatively from an initial 0. With the pipetting device according to the invention and the pipetting method according to the invention, movement of the pipetting piston can admittedly occur already as from the immersion of the pipetting aperture in a dosing liquid reservoir even though the step reference volume continues to exhibit only the value 0, for instance in order to counteract a flow of dosing liquid through the pipetting aperture which is effected solely by capillary forces. However, such piston movements are merely correction movements which can last arbitrarily long. In the event of doubt, the pipetting procedure within the meaning of the present invention begins when the pipetting piston begins to move due to a change of an incremental step reference volume from an initial 0 value to a value different from 0. The difference between two temporally immediately consecutive cumulative and/or absolute step reference volumes respectively is equivalent here to an incremental step reference volume.

For the most stable regulation method possible which is only slightly susceptible to external effects, the control device can be configured to define the established target step movement volume through quantification of at least two of the following three parameters:

Target end-position of the dosing-side piston surface at the end of the subsequent pipetting piston movement step, Target displacement velocity of the piston surface during the subsequent pipetting piston movement step, and Duration of the subsequent pipetting piston movement step.

Consequently, not only the position of the dosing-side end surface but also the displacement velocity can be specified. For example, different displacement velocities or movement durations can be stored in the aforementioned data memory of the control device for different values of target dosing liquid quantities and/or for different values of step reference volumes.

As is shown above with the aid of Equations 10, 10', and 10'', the control device can be configured to form the second correction variable based on the part of the working gas situated in the second working range and a product of a pressure ratio and a temperature ratio, where the pressure ratio is a ratio of the acquired working gas pressure and the working gas reference pressure and where the temperature ratio is a ratio of the working temperature and the base temperature.

For a highly accurate and likewise rapid movement of the dosing-side piston surface, it is advantageous if the driving device comprises a linear motor whose rotor is the pipetting piston. Then the operating device for exerting a sufficiently high driving force on the pipetting piston preferably comprises a plurality of current-carrying coils which are arranged radially outside the pipetting duct along a drive section. In order to achieve the most homogeneous driving force possible on the pipetting piston, the coils preferably surround the pipetting duct in a closed manner in the circumferential direction about the duct axis. Since the coils, which carry current at least part of the time, form a heat source, the second working range comprises the drive section. Therefore, the volume traversed by the dosing-side piston surface during its displacement preferably lies completely in the second working range. For reasons of having the most foreseeable thermal conditions possible, the first working range reaches along the duct path up to the arrangement region of the coils. Preferably, therefore, the section of the pipetting duct which extends from the pipetting aperture-side longitudinal end of the arrangement region of the coils up to the pipetting aperture is exposed to the external environment of the pipetting device and forms the first working range.

In principle, a known working temperature can set in during the operation of the pipetting device in the second working range in a dynamic thermal equilibrium. This equilibrium working temperature can be stored in the aforementioned data memory and used in regulating the pipetting procedure. Acquiring the temperature in the second working range by means of sensors, however, is more reliable and more accurate than trusting to a thermal equilibrium setting in again and again. Therefore according to a preferred development of the present invention, the pipetting device exhibits a temperature sensor for acquiring the working temperature which outputs a working temperature signal representing the working temperature.

To avoid contamination by consecutive pipetting of different dosing liquids with the same pipetting duct, the pipetting duct preferably exhibits a device-fixed duct section with a coupling formation and with a pipetting tip coupled detachably to the coupling formation. The pipetting tip then exhibits the pipetting aperture. Dosing liquid is then pipetted only into the pipetting tip, but not into the device-fixed duct section.

In addition to the pressure- and temperature-induced change in the working gas reference volume during a pipetting procedure, unavoidable leaks in the region surrounding the working gas can also have an adverse effect on pipetting accuracy. For example, working gas can flow past the pipetting piston or also away via the coupling formation for the coupling of the pipetting tip. Therefore preferably the control device is configured to establish a third correction variable which represents a pipetting duct leak, where the control device is configured to establish the target step movement volume of the pipetting piston additionally on the basis of the third correction variable. Then the above Equation 10 can for example be modified to:

$$V_{liquid} = V_{piston} - \Delta V_{piston} - \Delta V_{sys,res} - \Delta V_{leakage} \quad \text{Eq. 11}$$

Preferably, the starting point here is a leakage volume $\Delta V_{leakage}$ as the third correction variable. This depends preferably on a design-dependent leakage rate $K_L$ as a leakage parameter and on the pressure difference between the pressure $p_{AB1}$ inside the pipetting duct and the ambient pressure $p_\infty$, and also on the effective duration of the pressure difference:

$$\Delta V_{leakage} = \int_{t1}^{t2} K_L \cdot (p_{AB1} - p_\infty) \cdot dt \quad \text{Eq. 12}$$

To quantify the leakage volume as the third correction variable, the control device can be configured to establish the third correction variable on the basis of the pressure acquisition signal and a time duration, in particular the duration of the pipetting piston movement step.

The control device can further be configured to establish the third correction variable also on the basis of the leakage parameter $K_L$. Since the leakage parameter can change over time for a particular pipetting device, in order to update the leakage parameter quantitatively the control device can be further configured to determine the leakage parameter in response to a manual control input or through predetermined automated control, carrying out a acquisition of a leakage-dependent temporal change in an initially defined working gas pressure.

For example, the control device can, in response to a manual control input or through predetermined automated control, for instance at regular predetermined time intervals, couple a pipetting tip with a closed pipetting aperture and/or without a pipetting aperture respectively to the device-fixed duct section, set a predetermined pressure of the working gas in the pipetting duct through movement of the pipetting piston, and acquire the change in the working gas pressure over a specified time duration. The control device can quantify the leakage parameter from the change in the working gas pressure over the specified time duration and from the pressure difference between the working gas pressure in the pipetting duct and the ambient pressure of the pipetting device.

The pipetting device can exhibit a pressure sensor for acquiring the ambient pressure. Alternatively, the ambient pressure can be input manually via an input device.

The present invention also solves the task mentioned at the beginning through a method for correct dosing of a dosing liquid with a pipetting device, in particular with a pipetting device as described above and developed, independent from the flow and/or wetting properties of the dosing liquid, where the pipetting duct exhibits a first working range whose known base temperature lies in a lower base temperature range and exhibits a second working range whose known working temperature lies in a working temperature range higher than the base temperature range, where the method performs a stepwise displacement of a pipetting piston accommodated movably in a pipetting duct, where after a first movement step of a pipetting piston for a subsequent pipetting piston movement step the method comprises the following method steps:

Acquiring the pressure of the working gas,

Acquiring the pipetting piston's position,

Establishing a first correction variable which represents a pressure change-induced volume change in a first part, located in the first region, of a working gas volume enclosed in the pipetting duct, on the basis of the acquired pipetting piston position, of the acquired working gas pressure, and of a working gas reference pressure, Establishing a second correction variable which represents a both pressure change-induced and temperature change-induced volume change in a part, located in the second working range, of the working gas volume enclosed in the pipetting duct, on the basis of the acquired pipetting piston position, of the acquired working gas pressure, of the working gas reference pressure, of the known working temperature, and of the known base temperature, Establishing an estimated value for dosing liquid present in the accommodating space on the basis of the acquired pipetting piston position, of an earlier pipetting piston position, of the first correction variable, and of the second correction variable, Establishing or retrieving from a data memory a step reference volume assigned to the subsequent pipetting piston movement step, Comparing the estimated value and the step reference volume with one another, Establishing a target step movement volume for displacement of the pipetting piston in the subsequent pipetting piston movement step.

Displacing the pipetting piston by the target step movement volume.

The working temperature can be known, because it sets in during the operation of the pipetting device as equilibrium temperature in the second working range. The method can, however, also exhibit the step of acquiring the working temperature in the second working range of the pipetting duct.

Developments of the pipetting device described above, which preferably work according to the stated method, are also developments of the method according to the invention and vice versa.

BRIEF DESCRIPTION OF THE DRAWING FIGURES

Figure 2:
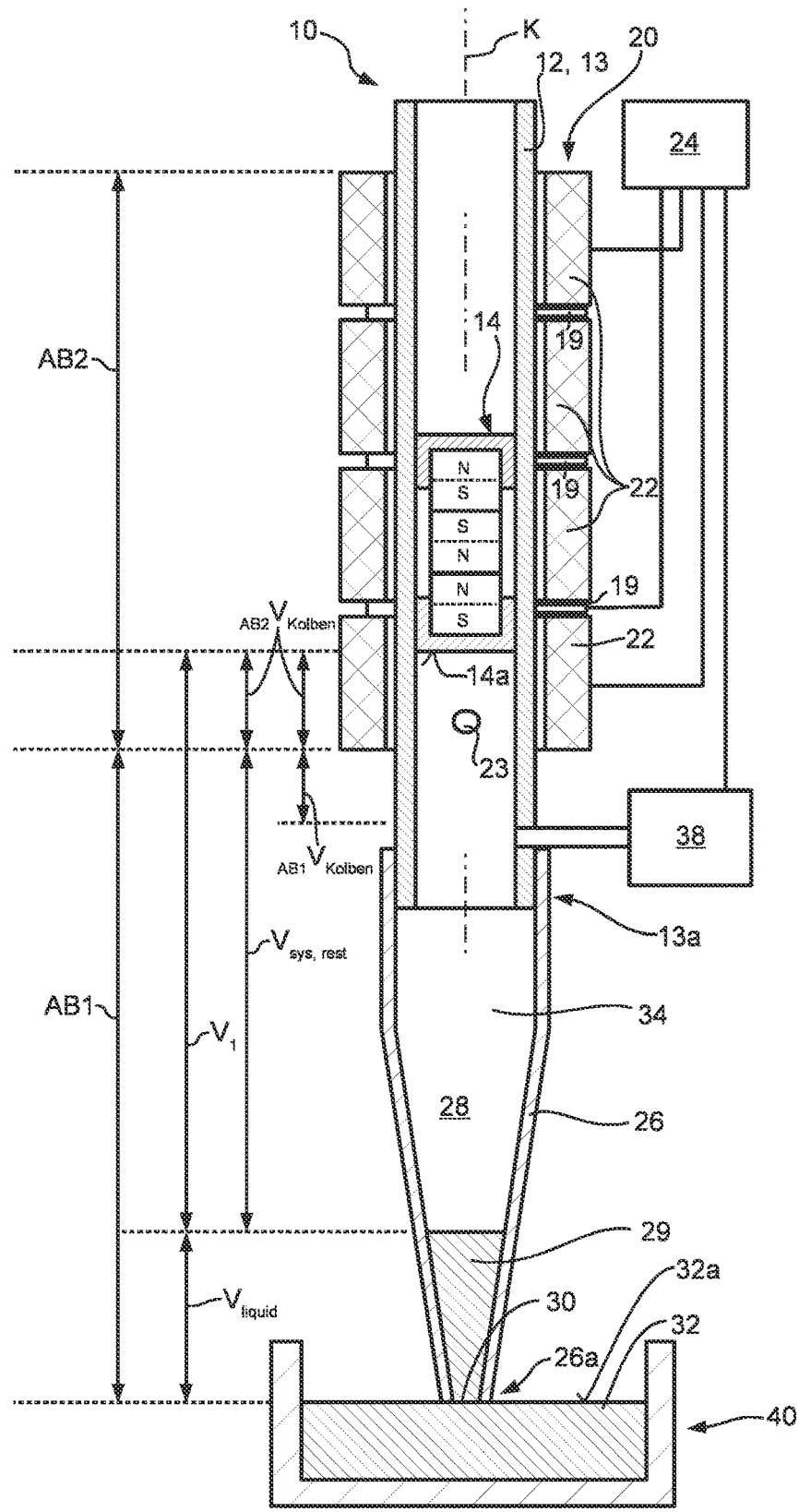
Figure 3:
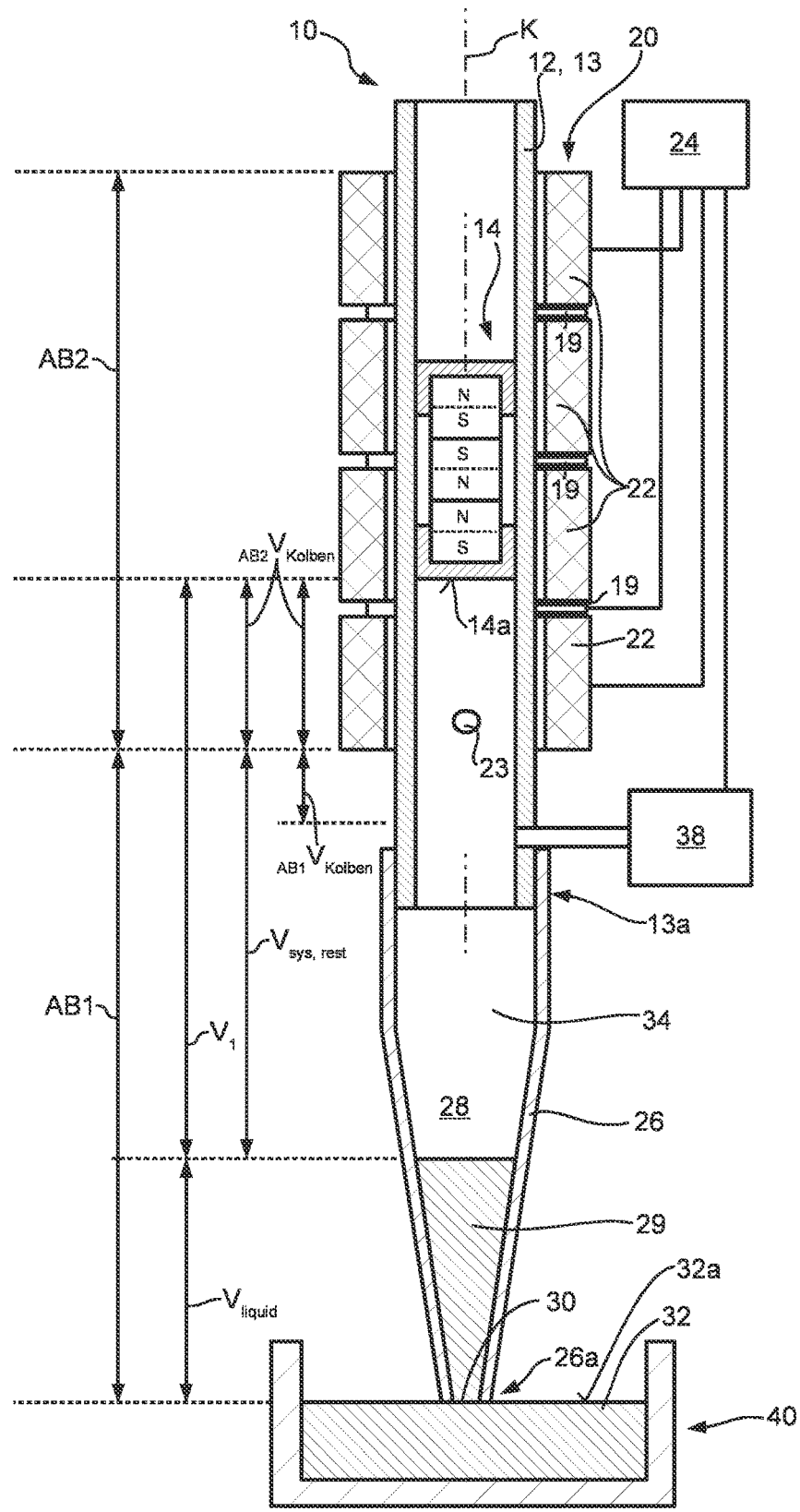
Figure 4:
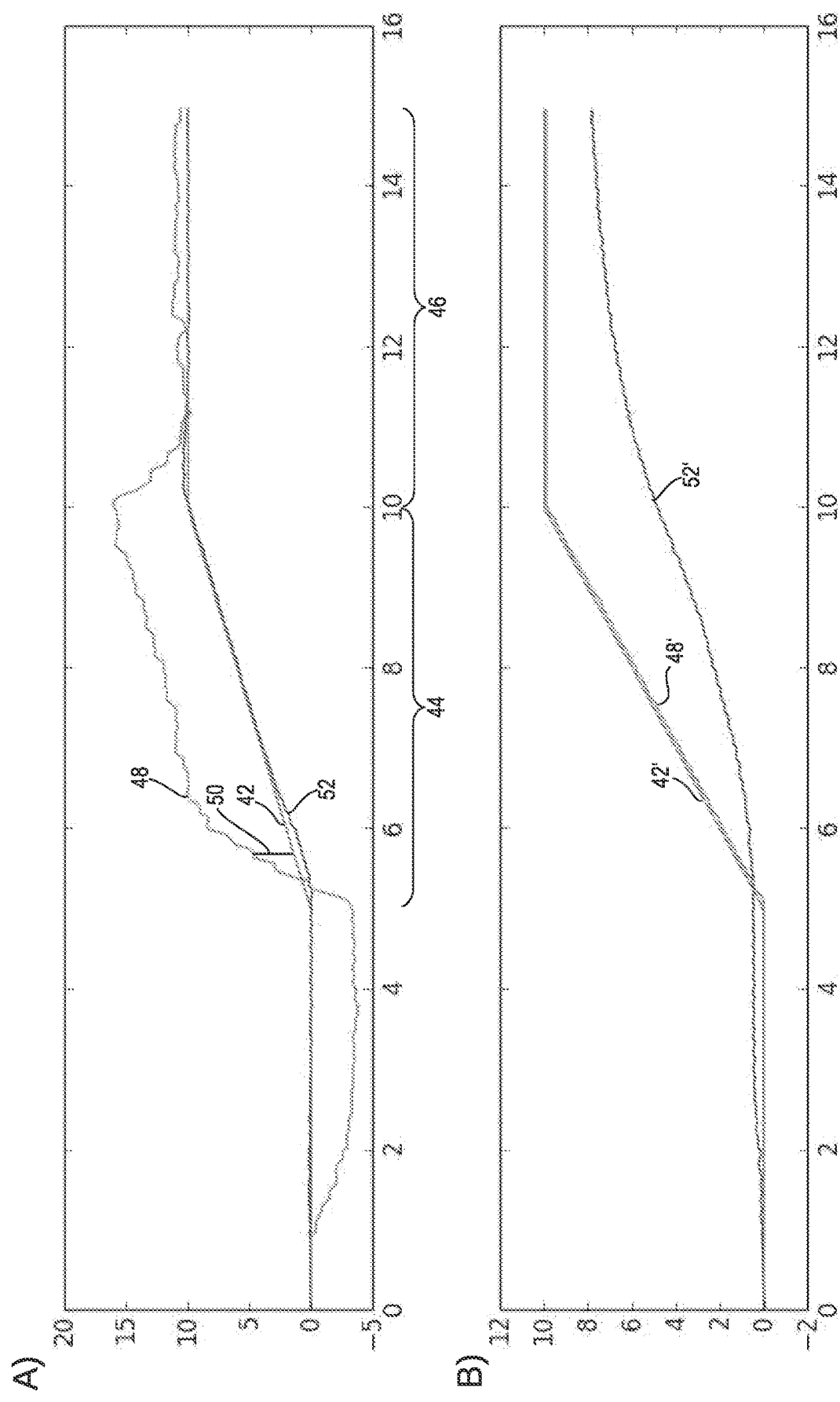

The present invention is elucidated below in more detail by reference to the attached drawings. The drawings depict:

FIG. 1 An embodiment form according to the invention of a pipetting device of the present application at the start of an aspiration method according to the invention as a pipetting method of the present application, FIG. 2 The pipetting device of FIG. 1 during the pipetting method after a first, smaller aspiration advance, FIG. 3 The pipetting device of FIGS. 1 and 2 during the pipetting method after a second, greater aspiration advance, FIG. 4A A graph of an aspiration procedure according to the invention with a depiction of the step reference volume, of the estimated value for the volume of dosing liquid accommodated in the pipetting duct, and of the volume traversed by the dosing-side piston surface, and FIG. 4B A graph of a conventional aspiration procedure with control only of the piston stroke in accordance with the target dosing liquid volume to be dispensed.

DETAILED DESCRIPTION OF THE PREFERRED EMBODIMENTS

In FIGS. 1 to 3, a pipetting device according to the invention is denoted generally by 10. It comprises a pipetting duct 12, formed by a cylinder 13 as a device-fixed duct section and by a pipetting tip 26 that can be coupled detachably with the cylinder 13. The pipetting duct 12 extends along a duct path K configured as a straight duct axis. In this pipetting duct 12 there is accommodated movably along the duct path K a piston 14.

The piston 14 comprises two end-caps 16 labelled only in FIG. 1 with reference labels, between which a plurality of permanent magnets 18 (in the present example three permanent magnets 18) are accommodated. In order to achieve a sharply differentiated magnetic field along the duct path K, the permanent magnets 18 are polarized along the duct axis K and arranged pair-wise with similar poles facing towards one another. From this arrangement there results a magnetic field going out from the piston 14, which to the greatest possible extend is uniform about the duct axis K, i.e. essentially rotation-symmetrical in respect of the duct axis K, and which exhibits along the duct axis K a high gradient of the magnetic field strength, such that opposite polarization zones alternate with one another in a sharply differentiated manner along the duct path K. Thereby, for example, by means of Hall sensors 19 which are indicated only symbolically, high positional resolution can be achieved in the positional acquisition of the piston 14 along the duct axis K, and very efficient coupling of an external magnetic field to the piston 14 can be achieved.

The end-caps 16 are preferably formed of low-friction material comprising graphite, as is known for example from commercially available pistons of Airpot Corporation in Norwalk, Connecticut, (US). In order to be able to exploit as fully as possible the low friction offered by this material, the cylinder 13 is preferably configured as a glass cylinder such that during movement of the piston 14 along the duct axis K, the graphite-comprising material slides with extremely low friction against a glass surface.

The piston 14 thus forms a rotor of a linear motor 20, whose stator is formed by the coils 22 surrounding the pipetting duct 12 (only four coils are depicted here by way of example).

Let it be pointed out expressly that FIGS. 1 to 3 show merely a rough schematic longitudinal section depiction of a pipetting device 10 according to the invention, which should by no means be understood as being to scale. Furthermore, pluralities of components are depicted by an arbitrary number of components, such as for instance three permanent magnets 18 and four coils 22. In fact, both the number of the permanent magnets 18 and the number of the coils 22 can be greater or indeed smaller than the depicted number.

The linear motor 20, more precisely the coils 22, are actuated via a control device 24 which is connected with the coils 22 for signal transmission. The transmission of electric current for energizing the coils and thus for creating a magnetic field by them also counts as a signal. The control device 24 receives from a pressure sensor 38 pressure acquisition signals which represent the pressure of a working gas 34 in the pipetting duct 12, receives from the Hall probes 19 position acquisition signals which represent the position of the pipetting piston 14, and receives from a temperature sensor 23 temperature acquisition signals which represent the temperature of the working gas 34 in a second working range AB2 of the pipetting duct 12 elucidated further below. The temperature sensor 23 is obscured in FIG. 1 by the pipetting piston 14 and is visible only in FIGS. 2 and 3.

At the dosing-side end 13a of the cylinder 13 there is mounted detachably in a manner known per se a pipetting tip 26 which extends the pipetting duct 12 beyond the cylinder 13. The connection of the pipetting tip 26 with the dosing-side longitudinal end 13a of the cylinder 13 is likewise depicted only in rough schematic form.

The pipetting tip 26 defines a pipetting space 28 in its interior which at the coupling-remote longitudinal end 26a is accessible solely through a pipetting aperture 30.

In the example of an aspiration procedure depicted in FIGS. 1 to 3, a quantity 31 of dosing liquid 32 is accommodated in the pipetting space 28. FIG. 1 shows an operating state of the pipetting device 10 at the start of an aspiration procedure, in which the pipetting duct 12 with the pipetting tip 26 and its pipetting aperture 30 just touches the liquid level 32a of a dosing liquid reservoir 40, such that working gas 34 is enclosed between the pipetting aperture 30 and the dosing-side piston surface 14a. The dosing-side piston surface 14a is formed in the present example by an end surface of the end-cap 16 facing in the axial direction—relative to the duct path K—towards the dosing aperture 30.

Between the piston 14 and the dosing liquid 32 there is situated permanently, in the air-displacement pipetting method considered here, the working gas 34 which serves as a force mediator between the piston 14 and the dosing liquid 32.

In the operating state shown in FIG. 1, there is enclosed between the dosing-side piston surface 14a and the pipetting aperture 30 closed off by dosing liquid 32, working gas 34 with a working gas dead volume $V_T$. In the initial state of the pipetting device 10, the dosing-side piston surface 14a is preferably situated at a lower dead point for the subsequent aspiration procedure. In it, the dosing-side piston surface 14a is situated in a first working range AB1 which reaches from the pipetting aperture 30 up to the axial beginning of the linear motor 20. In this first working range AB1, the pipetting duct 12 is bathed radially outside directly by the ambient atmosphere, such that the temperature $T_{AB1}$ of the enclosed working gas 34 in the first working range AB1 corresponds constantly to the ambient temperature $T_\infty$. Since the pipetting space 28 could communicate with the ambient atmosphere until shortly before the setting down of the pipetting aperture 30 on the surface 32a of the dosing liquid 32, in the operating state of the pipetting device 10 of FIG. 1 the pressure $p_{AB1}$ of the enclosed working gas 34 is the ambient pressure $p_\infty$. FIG. 1 shows the pipetting device 10 in a reference state of the subsequent aspiration procedure. The mentioned parameter values are, therefore, reference values.

Due to the construction, to the first working range AB1 there joins axially a second working range AB2 which extends axially over the length of the linear motor 20 and/or of the arrangement of the coils 22 of same, respectively. The current-carrying coils 22 along the duct path K for driving the pipetting piston 14 constitute a heat source which during operation cause along their extension, i.e. along the second working range AB2, that the temperature $T_{AB2}$ inside the pipetting duct 12 is raised in the second working range AB2 compared with the temperature $T_{AB1}$ in the first working range AB1. The increased temperature $T_{AB2}$ in the second working range AB2 is either acquired with the temperature sensor 23 shown in FIGS. 2 and 3 or is known, because a constant increased equilibrium temperature $T_{AB2}$ sets in during permanent operation of the pipetting device 10.

Let the dosing liquid 32 and the material-dependent parameters necessary for its aspirating and dispensing be unknown.

Starting from the initial situation of FIG. 1, a predetermined quantity of dosing liquid 32 should be aspirated into the pipetting duct 12. To this end, the pipetting piston 14 is moved at a step frequency of between 100 Hz and 50,000 Hz along the duct path K in the aspirating direction, that is, away from the pipetting aperture 30. The movement is regulated by the control device 24.

The control device 24 calls up the ambient pressure and the ambient temperature via a manual input, a network-aided data query, or further sensors not depicted specifically. In addition, the control device 24 reads out a number of pipetting piston movement steps stored in a data memory of the control device 24, and preferably depending on the target dosing liquid quantity to be aspirated. Alternatively, this number of pipetting piston movement steps can also be calculated by the control device 24 by means of a formula or input into it via manual input.

Starting from the known target dosing liquid quantity to be aspirated, the control device receives step reference volumes by querying an appropriately filled data memory or by calculation from a formula for the individual pipetting piston movement steps, either as an incremental step reference volume which, given knowledge of the size of the dosing-side piston surface 14a, should be traversed starting from a piston position at the start of a pipetting piston movement step, or as a cumulative step reference volume which, given knowledge of the size of the dosing-side piston surface 14a, indicates the end-position at the end of a pipetting piston movement step. A step-correction movement volume as a correction value is initialized, for example by the value 0.

By means of appropriate energizing of the coils 22, the dosing-side piston surface 14a is displaced away from the pipetting aperture 30 in a first pipetting piston movement step by a target step movement volume in accordance with the sum of the step reference volume for this movement step and the step-correction movement volume for this movement step. Since the step-correction movement volume for this first step exhibits by way of example the initialization value 0, in this case the target step movement volume is the step reference volume.

Since the pipetting piston movement step, starting from the initial position of the dosing-side piston surface 14a, lies completely in the first working range AB1 of the pipetting duct 12, the change of state of the enclosed working gas 34 effected by the movement of the dosing-side piston surface 14a is treated as an isothermal change of state.

The pressure $p_{AB1}$ of the enclosed working gas 34 is acquired via the pressure sensor 38, and due to the performed piston movement is lower than the initial ambient pressure $p_\infty$.

The quantity of dosing liquid $V_{liquid}$ present in the pipetting duct 12 after the first pipetting piston movement step is evaluated as an estimated volume using the above Equation 10'—or using the above Equation 11 if leakage losses are to be taken into account—with a known $V_{piston}$ which in this case corresponds to the first step reference volume, and because of the exclusive movement of the piston surface 14a in the first working range, with $AB2V_{piston}=0$, and with the measured pressure $p_{AB1}$ of the enclosed working gas 34.

A difference value is formed with the step reference volume and with the estimated volume $V_{liquid}$, for instance by difference formation, which indicates the quantitative difference between the step reference volume and the estimated volume $V_{liquid}$.

Starting from the difference value, the step-movement volume is calculated as a correction value through PID control which in principle is known, with which the step reference volume of the subsequent pipetting piston movement step is corrected to a target step movement volume. To this end, the difference value is converted to the step-correction movement volume with a proportional conversion element, a differential conversion element, and an integral conversion element. The individual conversion elements can be weighted using experimentally determined weighting factors.

The counter of the pipetting piston movement steps is incremented by 1, and if the maximum number of pipetting piston movement steps has not yet been reached, the step reference volume assigned to the next pipetting piston movement step is used and corrected with the previously determined step-correction movement volume to a target step movement volume, for example by sum formation or difference formation. The dosing-side piston surface 14a is then moved in accordance with the target step movement volume, taking its area size into account, i.e. the target step movement volume is divided by the quantitative size of the dosing-side piston surface 14a and the displacement path of the piston surface 14a along the piston path K is thus obtained.

Then once again, as described above, the pressure $p_{AB1}$ of the enclosed working gas 34 is acquired and the quantity of dosing liquid $V_{liquid}$ present in the pipetting duct 12 after the performed pipetting piston movement step is estimated from Equation 10'—or from Equation 11 if leakage losses are to be taken into account—with a known $V_{piston}$, still with $AB2V_{piston}=0$, and with the measured pressure $p_{AB1}$ of the enclosed working gas 34.

There follows again the described formation of the difference value between the step reference volume and the estimated value $V_{liquid}$ and from this the calculation described above of a further step-correction movement volume. This further step-correction movement volume serves again in turn to establish the next target step movement volume. This is followed by incrementation of the step counter and once more by the movement of the dosing-side piston surface 14a.

This sequence is run iteratively in the described manner until the dosing-side piston surface 14a has reached the boundary between the first and the second working range AB1, AB2 such that further movement of the piston surface 14a no longer takes place in the first working range AB1 but in the second working range AB2.

When the dosing-side piston surface 14a is moved into the second working range AB2, such that with a movement of the piston surface 14a a displacement of enclosed working gas 34 between the first working range AB1 and the second working range AB2 is effected, basically the above sequence is maintained, however in the above Equations 10, 10', or 10" and/or 11 respectively, which can be used to determine the estimated value $V_{liquid}$, the current value of $AB2V_{piston}$ which is then different from 0 is used. The displacement of working gas fractions between the first working range AB1 and the second working range AB2 and their temperature change, are hereby taken into account in addition to the pressure change.

Therefore the dosing-side piston surface 14a is again displaced, in accordance with the latest calculated target step movement volume. Then the pressure $p_{AB1}$ of the enclosed working gas 34 is acquired by the pressure sensor 38 and the temperature $T_{AB2}$ of the working gas in the second working range AB2 is acquired by the temperature sensor 23. The temperature TABS of the working gas in the first working range AB1 continues to be assumed constant, and based on the aforementioned considerations set equal to the ambient temperature $T_\infty$.

Subsequently, using the acquired parameters, based on one of the Equations 10, 10', or 10" and/or 11 respectively, an estimated value $V_{liquid}$ is determined for the volume of dosing liquid 32 accommodated in the pipetting duct 12. By comparing the estimated value with the step reference volume assigned to the current pipetting piston movement step, a difference value is determined, and on the basis of the difference value the step-correction movement volume is established with the aid of the PID control described above and in principle known. With this step-correction movement volume, the step reference volume is corrected to a target step movement volume.

If, after incrementation of the step counter, the maximum step number for the pipetting procedure has not yet been reached, the next pipetting piston movement step is performed with the target step movement volume as a target specification for a movement of the dosing-side piston surface 14a.

This sequence is run iteratively until either the maximum step number determined for the pipetting procedure is reached or until the difference value, where applicable a predetermined number of consecutive steps, lies below a predetermined quantitative threshold, such that the estimated volume of dosing liquid 32 present in the pipetting duct, determined with one of the Equations 10, 10', or 10" and/or 11 respectively, agrees sufficiently accurately with the target dosing liquid quantity.

Advantageously, the course of the step reference volumes over the number of pipetting piston movement steps provided for a pipetting procedure is chosen not linearly but degressively, i.e. the accretion value of the cumulative step reference volume or of the cumulative incremental step reference volumes—as applicable—is greater at the start of the pipetting procedure than towards the end of the pipetting procedure. In this process, for at least the last 30% of the pipetting piston movement steps of a pipetting procedure, the step reference volume changes quantitatively by no more than 10% based on the greater of two comparison values. The advantage of a degressive course of step reference volumes is that towards the end of the pipetting procedure, the effect on the movement of the dosing-side piston surface 14a of the correction values determined from the difference values predominates. Consequently, towards the end of the pipetting procedure, for example during the last 30% of the pipetting piston movement steps, the effect of the different flow properties of different dosing liquids can be compensated for by determining the difference values and the correction values (step-correction movement volumes) resulting therefrom.

Different dosing liquids converge at different speeds to the desired target dosing liquid quantity, depending on their influencing variables which are relevant for pipetting such as viscosity, density, surface tension, wetting behavior relative to the material of the pipetting duct. If one chooses a sufficiently large number of pipetting piston movement steps, one can make sure that even dosing liquids with comparatively high density and high viscosity can be pipetted accurately without knowing their exact liquid parameters.

FIG. 4A depicts the graph of an aspiration procedure as an embodiment example of a pipetting procedure according to the invention. The abscissa of the coordinate system of FIG. 4A denotes the time in seconds, i.e. from 0 to 16 seconds. The ordinate denotes a volume in microliters (μl), i.e. from −5 to 20 μl.

The target dosing liquid volume to be aspirated is 10 μl. The dosing liquid to be aspirated is glycerin.

The course of the step reference volume is shown as a cumulative value and denoted by the reference label 42. Until t=5 seconds after the start of the aspiration procedure it stays at a value of 0 μl and then increases in a time range from 5 seconds to 10 seconds linearly from 0 μl to the target dosing liquid volume of 10 μl. The pipetting procedure therefore begins only at t=5 s. In the time range from 10 to 15 seconds, the step reference volume stays at the value of the target dosing liquid volume of 10 μl. The range from 5 seconds to 10 seconds thus forms a first step range 44 in the sense described above, in which the cumulative step reference volume increases to at least 95% of the target dosing liquid volume. The range from 10 to 15 seconds forms a second step range 46 in the sense described above, in which the cumulative step reference volume does not depart from a range from 95% to 105% of the target dosing liquid volume. More precisely, the cumulative step reference volume increases in the first step range 44 from 0% to exactly 100% of the target dosing liquid volume and stays in the second step range 46 at exactly 100% of the target dosing liquid volume. The volume traversed by the dosing-side end surface 14a during the pipetting procedure is plotted in FIG. 4A and denoted by the reference label 48.

Starting from the 0 position at the beginning of the pipetting procedure, at first the volume traversed by the dosing-side end surface 14a is negative, i.e. the dosing-side end surface 14a approaches the pipetting aperture 30 in the dispensing direction in order to counteract a flow of glycerin into the pipetting tip 26 effected by capillary forces.

The volume difference 50 between the volume traversed by the dosing-side end surface 14a, which in fact corresponds to the movement volume and consequently to the cumulative target step movement volume of the dosing-side end surface 14a, and the step reference volume, is the step-correction movement volume calculated as described above.

The estimated value of the dosing liquid volume accommodated in the pipetting duct 12 and/or in the accommodating space 28 respectively, calculated as above, is denoted by the reference label 52.

As FIG. 4A shows, at first only a capillary flow of glycerin into the pipetting tip 26 is prevented by a movement of the pipetting piston 14 according to the target specification provided by the step reference volume 42.

When at time 5 seconds the step reference volume 42 begins to get quantitatively larger, at first the dosing liquid stays below the step reference volume 42, but when at time 10 seconds the step reference volume 42 stays constantly at the attained target dosing liquid volume, it overshoots the step reference volume.

As already described in detail above, the second step range 46 adjoining the first step range 44 serves, after a rough uptake of approximately the target dosing liquid volume into the accommodating space 28, to correct through correction movements of the dosing-side end surface 14a for the dosing liquid's propensity towards overshooting and/or after-flowing respectively. Since the target dosing liquid volume was for the most part already accommodated in the accommodating space 28 in the first step range 44, the individual target step-movement volumes of the dosing-side end surface 14a come out smaller in the second step range 46 than in the first step range 44, which overall results in high dosing accuracy of the pipetting procedure. In the depicted example, the second step range 46 lasts approximately just as long as the first step range 44 and therefore comprises about as many movement steps of the pipetting piston 14.

FIG. 4B plots how glycerin behaves during a purely distance-time controlled aspiration movement of the pipetting piston 14, when the latter is raised by the desired target dosing liquid volume, taking into account the area of the dosing-side end surface 14a.

Once again, the abscissa denotes the time in seconds and the ordinate a volume in μl.

The target movement trajectory of the dosing-side end surface 14a is denoted in FIG. 4B by the reference label 42'. This corresponds exactly to the cumulative step reference volume of FIG. 4A.

The movement curve of the dosing-side end surface 14a, which follows the target movement trajectory 42' in a distance-time controlled manner, is denoted by the reference label 48'. Since distance-time control of the dosing-side end surface 14a in accordance with the target movement trajectory 42' is technically unproblematic, the dosing-side end surface 14a follows the target specification very accurately.

The dosing liquid volume accommodated in the pipetting tip 26 is plotted over time and denoted by the reference label 52. In the graph of FIG. 4B it is very easy to recognize that without appropriate counter-control by the pipetting piston 14, at approximately t=1 second glycerin begins, driven only by capillary forces, to flow through the pipetting aperture 30 into the accommodating space 28 of the pipetting tip 26. At t=1 second, in both cases, i.e. in accordance with FIGS. 4A and 4B, the pipetting aperture 30 is immersed in the dosing liquid reservoir 32.

With the start of the piston movement at time t=5 s, glycerin also starts continuing to flow into the accommodating space 28 of the pipetting tip 26, this time however driven by the low pressure, relative to the ambient pressure, produced in the working gas 34 by the piston movement.

After the end of the piston movement at time t=10 s, glycerin continues to flow through the pipetting aperture 30 into the accommodating space 28 until the low pressure in the pipetting duct 12 (and thereby in the accommodating space 28) has decreased so far that essentially it is in equilibrium of forces with the liquid column 29 formed by glycerin in the accommodating space 28. As a result, however, only somewhat less than 8 μl of glycerin are accommodated in the accommodating space 28, even though the pipetting piston 14 as a driver of the glycerin uptake performs a 10 μl movement.

In conventional pipetting systems, a liquid class would be stored in the data memory of the control device 24 to which glycerin would be assigned and from which a factor would be retrievable by which the target movement volume of the pipetting piston 14, starting from the desired 10 μl, has to be increased such that the desired 10 μl of glycerin would be accommodated in the pipetting tip 26 at the end of the piston movement. This factor should be determined empirically in the laboratory.

As a comparison of FIGS. 4A and 4B shows, with the present invention the desired target dosing liquid volume can be pipetted highly accurately, based on the described volume-based control, without knowing the liquid class of the dosing liquid and without knowing the concrete flow properties of the dosing liquid and even in a shorter time highly accurately than with a conventional distance- or distance-time movement-controlled pipetting piston 14.

The invention claimed is:

1. A pipetting device for pipetting, that is, for aspiration and/or for dispensing, of a dosing liquid under the mediation of a working gas, where the pipetting device comprises:
   a pipetting duct extending along a duct axis,
   a pipetting piston movable in the pipetting duct along the duct axis,
   an accommodating space for accommodating dosing liquid, which extends in the pipetting duct along the duct axis from a pipetting aperture at one end up to a dosing-side piston surface of the pipetting piston facing towards the pipetting aperture at the other end, where working gas is accommodated in the pipetting duct immediately adjacent to the dosing-side piston surface, where a working gas reference volume is defined by the volume of working gas which is situated in the accommodating space under a working gas reference pressure,
   a driving device coupled in a force-transmitting manner with the pipetting piston, configured to displace the pipetting piston along the duct axis,
   a position acquisition device which acquires a position of the pipetting piston along the duct axis and outputs a position acquisition signal representing the acquired position,
   a pressure acquisition device which acquires a pressure of the working gas in the pipetting duct and outputs a pressure acquisition signal representing the acquired pressure, and
   a control device,
   where the control device is configured to actuate the driving device in accordance with
   the pressure acquisition signal,
   the working gas reference pressures, and
   a defined target dosing liquid volume to be pipetted,
   taking into account a pressure change-induced change in the working gas reference volume effected by the piston movement,
   where the control device is further configured to perform the piston movement required for pipetting the target dosing liquid volume in several consecutive movement steps,
   wherein the pipetting duct exhibits a first working range whose known base temperature lies in a lower base temperature range and a second working range whose known working temperature lies in a working temperature range higher than the base temperature range, where the control device is configured, after a first pipetting piston movement step for a subsequent pipetting piston movement step,
   to establish a first correction variable which represents a pressure change-induced volume change in a part, located in the first working range, of the of the working gas volume enclosed in the pipetting duct, on the basis of the position acquisition signal, of the pressure acquisition signal, and of the working gas reference pressure, and
   to establish a second correction variable which represents a both pressure change-induced and temperature change-induced volume change in a part, located in the second working range, of the working gas volume enclosed in the pipetting duct, on the basis of the position acquisition signal, of the pressure acquisition signal, of the working gas reference pressure, of the known working temperature, and of the known base temperature,
   and to establish a target step movement volume of the pipetting piston on the basis of
   a step reference volume assigned to the subsequent pipetting piston movement step,
   a previous displacement volume of the dosing-side piston surface of the pipetting piston in the current pipetting procedure,
   the first correction variable, and
   the second correction variable and to actuate the driving device in accordance with the established target step movement volume.

2. The pipetting device according to claim 1,
   wherein the control device is configured to determine, for the subsequent pipetting piston movement step on the basis of the previous displacement volume of the dosing-side piston surface of the pipetting piston in the current pipetting procedure, of the first correction variable, and of the second correction variable an estimated value for a dosing liquid quantity present in the accommodating space, to compare the determined estimated value with the step reference volume, and on the basis of the comparison result to establish the target step movement volume.

3. The pipetting device according to claim 2,
   wherein the control device is configured to perform consecutive pipetting piston movement steps until a difference quantity between the determined estimated value and the step reference volume falls below a predetermined difference threshold value.

4. The pipetting device according to claim 2,
   wherein the control device is configured to perform a predetermined number of pipetting piston movement steps.

5. The pipetting device according to claim 2,
   wherein the control device is configured to calculate a difference quantity between the determined estimated value and the step reference volume and to establish a fraction proportional to at least one of the difference quantity of a step-correction movement volume and an integral fraction of the step-correction movement volume which takes into account a sum of the difference quantity and at least one preceding difference quantity and a differential fraction of the step-correction movement volume which takes into account a difference between the difference quantity and a preceding difference quantity.

6. The pipetting device according to claim 1,
   wherein the control device is configured to establish the target step movement volume on the basis of the step reference volume and the step-correction movement volume, to establish the target step movement volume as step reference volume corrected by the step-correction movement volume.

7. The pipetting device according to claim 1,
   wherein the control device is configured to perform more than 100-pipetting piston movement steps per second, where the control device is configured to perform fewer than 100000 pipetting piston movement steps per second.

8. The pipetting device according to claim 1,
   wherein the control device is configured to read out from a data memory the step reference volume assigned to the subsequent pipetting piston movement step in accordance with at least one of the target dosing liquid volume and to calculate the same on the basis of the target dosing liquid volume.

9. The pipetting device according to claim 1, wherein either the step reference volume is an incremental step reference volume, where the cumulative value of the step reference volumes over the increasing number of steps exhibits a first step range in which the cumulative value increases from an initial value to a quantity of at least 95% of the target dosing liquid volume, and exhibits a second step range following the first step range in which the cumulative value does not depart from a range of 95% to 105% of the target dosing liquid volume, or the step reference volume is an absolute step reference volume, where the value of the absolute step reference volume exhibits over the increasing number of steps a first step range in which the value of the absolute step reference volume increases from an initial value to a quantity of at least 95% of the target dosing liquid volume, and exhibits a second step range following the first step range in which the value of the absolute step reference volume does not depart from a range of 95% to 105% of the target dosing liquid volume, where the second step range exhibits at least one of at least the same number of steps and lasts for at least the same time duration as the first step range.

10. The pipetting device according to claim 1, wherein the control device is configured to define the established target step movement volume through quantification of at least two of the following three parameters:

target end-position of the dosing-side piston surface at the end of the subsequent pipetting piston movement step, target displacement velocity of the dosing-side piston surface during the subsequent pipetting piston movement step, and duration of the subsequent pipetting piston movement step.

11. The pipetting device according to claim 1, wherein the control device is configured to form the second correction variable on the basis of the part of the working gas located in the second working range and a product of a pressure ratio and a temperature ratio, where the pressure ratio is a ratio of the acquired working gas pressure and the working gas reference pressure and where the temperature ratio is a ratio of the working temperature and the base temperature.

12. The pipetting device according to claim 1, wherein the driving device comprises a linear motor whose rotor is the pipetting piston, where the operating device comprises a plurality of current-carrying coils arranged along a drive section radially outside the pipetting duct, where the second working range comprises or is the drive section.

13. The pipetting device according to claim 1, wherein the first working range extends starting from the pipetting aperture in the direction towards the pipetting piston, up to the second working range.

14. The pipetting device according to claim 1, wherein the pipetting device exhibits a temperature sensor for acquiring the working temperature which outputs a working temperature signal representing the working temperature.

15. The pipetting device according to claim 1, wherein the pipetting duct comprises a device-fixed duct section with a coupling formation and a pipetting tip coupled detachably to the coupling formation, where the pipetting tip exhibits the pipetting aperture.

16. The pipetting device according to claim 1, wherein the control device is configured to establish a third correction variable which represents a leakage of the pipetting duct, where the control device is configured to additionally establish the target step movement volume of the pipetting piston on the basis of the third correction variable.

17. The pipetting device according to claim 16, wherein the third correction variable represents a leakage volume, where the control device is configured to establish the third correction variable on the basis of the pressure acquisition signal and of a duration of the pipetting piston movement step.

18. The pipetting device according to claim 16, wherein the control device is configured to establish the third correction variable also on the basis of a leakage parameter, where the control device is further configured to determine the leakage parameter in response to a manual control input or through predetermined automated control while performing a acquisition of a leakage-induced temporal change of an initially defined working gas pressure.

19. A method for correct pipetting of a dosing liquid with a pipetting device according to claim 1, independently of at least one of the flow and wetting properties of the dosing liquid, where the pipetting duct exhibits a first working range whose known base temperature lies in a lower base temperature range and a second working range whose known working temperature lies in a working temperature range higher than the base temperature range, where the method performs a stepwise displacement of a pipetting piston accommodated movably in a pipetting duct, where the method after a first movement step of the pipetting piston for a subsequent pipetting piston movement step comprises the following method steps:

acquiring the pressure of the working gas, acquiring the pipetting piston position, establishing a first correction variable which represents a pressure change-induced volume change of a first part located in the first working range of a working gas volume enclosed in the pipetting duct, on the basis of the acquired pipetting piston position, the acquired working gas pressure, and a working gas reference pressure, establishing a second correction variable which represents a both pressure change-induced and temperature change-induced volume change of a part located in the second working range of the working gas volume enclosed in the pipetting duct, on the basis of the acquired pipetting piston position, the acquired working gas pressure, the working gas reference pressure, the known working temperature, and the known base temperature, establishing an estimated value for dosing liquid present in the accommodating space on the basis of the acquired pipetting piston position, an earlier pipetting piston position, the first correction variable, and the second correction variable, establishing or retrieving from a data memory a step reference volume assigned to the subsequent pipetting piston movement step, comparing the estimated value and the step reference volume with one another,
establishing a target step movement volume for displacement of the pipetting piston in the subsequent pipetting piston movement step,
displacing the pipetting piston by the target step movement volume.

20. The method according to claim 19,
wherein it comprises the following further step:
acquiring the working temperature in the second working range of the pipetting duct.

* * * * *